May 14, 1940.                B. P. POND                 2,200,852
                         THERMOSTATIC SWITCH
                         Filed March 17, 1938
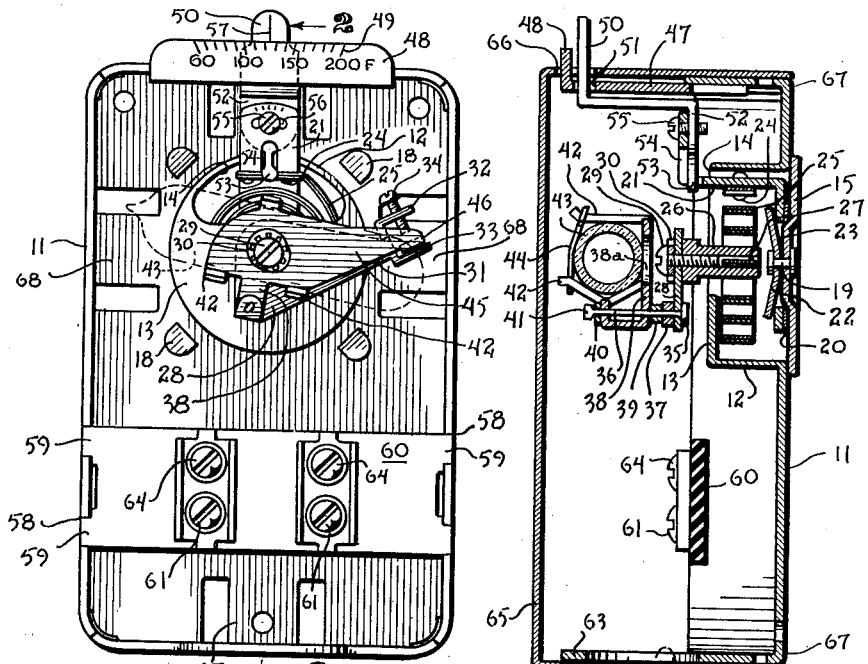
Fig.1                                               Fig.2
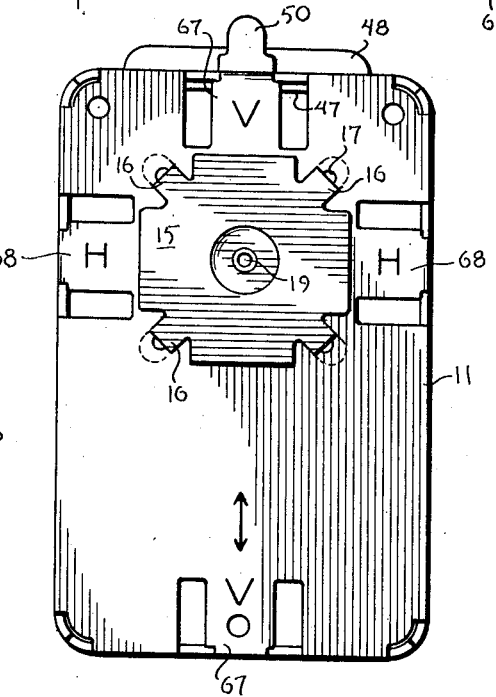
Fig.3
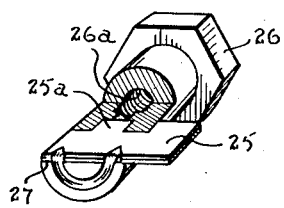
Fig.4
Inventor
Bertram P. Pond
By George H. Fisher
                Attorney Patented May 14, 1940

2,200,852

UNITED STATES PATENT OFFICE 2,200,852

THERMOSTATIC SWITCH

Bertram P. Pond, Minneapolis, Minn., assignor to Minneapolis-Honeywell Regulator Company, Minneapolis, Minn., a corporation of Delaware Application March 17, 1938, Serial No. 196,390

15 Claims. (Cl. 200—138)

This invention relates generally to thermostatic switches, and more particularly to that type of switch which is designed to respond to the surface temperature of a body.

One of the objects of this invention is to provide a switch casing which is adapted to be fastened to the surface of the body to whose temperature the switch is intended to respond and which has a special metal formed thereon for conducting the heat from the body directly to the thermostat in order to make it more sensitive.

Another object is to provide a switch casing where a part of the rear wall of the casing is drawn out to form a space or housing for a thermostat which is closed by means of a metal plate of high heat conductivity which is located on the rear wall of the casing.

Another object is to provide a thermostat casing and metal plate as set forth above wherein the thermostat is supported at one end by the metal plate, and at the other end supports a mercury switch.

A still further object of the invention is to provide a thermostatic switch casing of the type described which has part of its rear wall cut away to form four arms, two horizontal and two vertical, the two horizontal arms being used for mounting the casing on a horizontally extending pipe, and the two vertical arms being used for mounting the casing on a vertically extending pipe.

Another object is to provide a switch casing which has a minimum number of parts, which is easy and inexpensive to manufacture, and yet which is efficient and reliable in operation.

Another object is to provide a switch casing adapted to be mounted on a vertical or horizontal pipe which has no mounting arms extending out beyond the casing.

Another object is to provide a novel means for attaching the holder for a mercury switch to the free end of a thermostatic coil.

Other objects will become apparent as the following specification is read in the light of the accompanying drawing, in which:

Figure 1 is a front elevation of the switch casing with the cover removed;

Figure 2 is a section taken through the casing along the line 2—2 of Figure 1 looking in the direction of the arrows and showing the cover for the casing in place, Figure 3 is a rear elevation of the casing showing the mounting arms, and Figure 4 is a detail view showing the connection between the thermostat and mercury switch support.

The reference numeral 11 designates the casing which houses the thermostatic switch and which is adapted to be mounted in a vertical position. This casing is made by stamping it out of sheet metal in its developed form and bending the sides up as shown in the drawing. The back of the casing is drawn inwardly to form the sides 12 and front 13 of a housing for the thermostatic member. The front part of the housing is cut away as shown at 14 in order to permit the dissipation of heat from inside the housing. What may be termed a hot plate is designated at 15 and is made of a relatively thin sheet of copper having diagonally extending legs 16 which are inserted through holes 17 in the back of casing 11 and bent over as at 18 in order to securely fasten the plate to the back of the casing. This plate is so positioned as to constitute the rear wall of the thermostat housing and has a central depression therein. Placed around this depression on the inside of the plate is a relatively thin washer 20 and bearing against this washer is the annular end of a Z-shaped adjusting arm 21, the upper end thereof extending outside of the thermostat housing through the cut-away portion 14. Extending through the center of plate 15 is a spindle 19 having a pair of enlarged ends, said spindle retaining a washer 22 forcibly against the rim of the annular portion of arm 21 so that the arm 21 is clamped between the two washers 20 and 22 so that they resist movement thereof.

Located inside of the thermostat housing and secured at one end to arm 21, as shown at 24, is a coiled bimetallic thermostat 25, the free end of which carries a pin 26. The inner end of pin 26 is provided with a transverse slot 27 into which the free end of the thermostat 25 is extended. A hole 26a which is tapped for the major portion of its length extends longitudinally of the pin 26 and a projection 25a on the thermostat 25 extends into this hole a short distance. A pair of V-shaped notches are cut in the thermostat opposite the projection 25a and after the thermostat and pin have been assembled a circular staking tool is used to press the metal from around the slot 27 into the V-shaped notches in the thermostatic element 25 and thereby retain projection 25a in the hole 26a so that a strong and rugged connection is made between the thermostat and pin. An arm 28 is carried by pin 26 and is connected thereto by means of a screw 29 and spring washer 30, the screw being inserted in the threaded hole 26a to tightly clamp the arm and washer to the end of the pin 26. The arm 28 has an extension 31 which is provided with two parallel ears 32 and 33, the ear 32 having a threaded hole therethrough in which is threaded a screw 34. Extending through the lower part of the arm 28 and having an enlarged head 35 thereon is an axle 36 having a member 37 fixed thereto to prevent it from sliding with respect to the arm 28. Rotatably mounted on the axle is a switch carrier 38 which engages bearing members 39 and 40. It will be seen that a hole 38a is provided in the switch carrier 38 so that easy access may be had to screw 29 for the purpose of adjusting arm 28 with respect to pin 26. The end of the axle 36 is squeezed together as shown at 41 to prevent the switch carrier 38 from sliding off.

The switch carrier 38 is provided with three arms 42 which are adapted to hold a mercury switch 43 which is shown in dotted lines in Figure 1. In Figure 2, is shown a wire 44 which connects the three arms 42 and holds the mercury switch in position on the switch carrier 38. The carrier 38 is provided with an extension 45 having an inturned portion 46 which extends between the ear 33 and screw 34 on the arm 28 to provide a lost motion connection between the arm 28 and switch carrier 38. The screw 34 may be adjusted in ear 32 to vary the amount of the lost motion.

Attached to the underneath side of the top of the casing 11 and extending forwardly therefrom is a member 47 having an upturned portion 48 which carries a scale 49 on its face. An adjusting arm 50 extends through a slot 51 in the member 47 and has an extension 52 which is adjustably connected to the arm 21 by means of its end 53 engaging in a slot 54 in the arm 21, the extension 52 being provided with a threaded hole carrying a screw 55 which extends through an arcuate slot 56 in the arm 21. This structure provides for a relative adjustment between the arm 21 and the arm 50 so that the instrument may be properly calibrated in the factory. It is noted that a scale is provided on the arm 21 to indicate the relative adjustment between it and arm 50. After the adjustment has been made a small amount of cement is placed over the screw to make the adjustment permanent. The face of the arm 50 is provided with a marker 57 which cooperates with the scale 49 to indicate the temperature setting of the instrument.

The sides of the switch casing below the switch itself are provided with notches 58 in which are mounted extensions 59 of a panel board 60 carrying suitable terminals 61 which are adapted to connect with conductors from outside of the switch casing. These conductors are adapted to enter the casing by means of a hole 62 formed in the extension 63 at the bottom of the casing 11. The terminals 64 also mounted on the panel 60 are adapted to be connected with conductors, not shown, leading from the mercury switch.

Shown in Figure 2 is a cover 65 having a slot 66 in the top thereof through which are inserted the scale 48 and the indicating arm 50. A catch, not shown, is provided on the lower part of the casing to hold the cover in position.

Referring now to Figure 3, it will be seen that portions of the back of the casing 11 have been cut away to form four arms, two of which are indicated at 67 and extend vertically and the other two, 68, extend horizontally. These are provided for the purpose of mounting the instrument casing by means of straps to either a vertical or a horizontally extending pipe. Assuming that it is desired to mount the instrument on a vertical pipe, a strap will be looped over each of the arms 67 and then passed around the pipe and tightened so that the hot plate 15 will be held in direct contact with the metallic surface of the pipe. The heat from the pipe will then pass directly to the relatively thin copper plate 15 which will radiate heat to the thermostat 25 within the housing and also impart conducted heat through the arm 21 which is in direct contact with the thermostat. In this manner, the thermostat will respond relatively quickly to the heat which passes through the pipe to which the instrument is attached. In the case of a decrease in temperature, the opening 14 in the thermostat housing aids in dissipating the heat so that the thermostat will contract after a minimum lapse of time from the decreased temperature in the pipe. Any change in temperature at the thermostat will cause it to coil or uncoil thereby rotating the pin 26 and hence the arm 28 which in turn actuates the mercury switch.

Assume that the switch is in the position shown in Figure 1 and that the temperature is increasing, the thermostat 25 will uncoil causing the pin 26 to rotate in a counter-clockwise direction. It will be seen that at this time the mercury will be at the right-hand end of the glass tube 43 which will tend to rotate the tube in a clockwise direction and hence the ear 46 will be lying against the extension 33. As the thermostatic coil unwinds and the arm 28 rotates in a counter-clockwise direction, the ear 33 and extension 46 will be raised until the tube 43 reaches a substantially horizontal position, at which time the center of gravity of the switch and arm 28 will have shifted to the opposite side of a line passing vertically through the pin 36, causing them to rotate about said pin until the extension 46 strikes screw 34. At the same time the mercury will flow to the opposite side of the tube thereby breaking the circuit between the contacts. The structure providing this lost motion is for the purpose of providing an adjustable differential in the operation of the switch. It will be noted that adjusting the differential by means of the screw 34 will not vary the temperature at which the thermostat will open the switch.

On a decrease in temperature, the heat will be dissipated from the thermostat housing by means of the opening 14 and the thermostat 25 will tend to wind up causing the arm 28 to rotate in a clockwise direction. The extension 46 will be moved by means of the screw 34 until the switch is in a substantially horizontal position, at which time the center of gravity of the switch and arm 28 will shift back again to the other side of the axle 36 causing the mercury to pass from the left-hand end of the tube over to the right-hand end of the tube which will complete the circuit through the switch. The switch will rotate on the axle 36 until the extension 46 strikes the ear 33.

In order to adjust the temperature at which the thermostat actuates the switch to open or closed position, it is necessary only to rotate the indicating arm 50 which will carry with it the end 24 of the thermostat. As explained above, the screw 55 and slot 56 provide a calibrating adjustment whereby the indicator 57 may be properly located with respect to the scale 49 for any temperature setting of the instrument.

In the event that the casing should be mounted on a horizontal pipe, the two straps will be wrapped around the arms 68 and also around the pipe which will hold the hot plate 15 in firm engagement with the surface of the pipe. It will be noted that the arms 67 and 68 are so positioned with respect to the plate 15 that it will be held directly against the pipe regardless of whether the pipe extends vertically or horizontally.

One of the features of advantage of this casing is the fact that the supporting arms 67 and 68 are formed in the back of the casing itself so that when the cover 65 is placed on the instrument it extends over the ends of the arms rather than having the arms stick out beyond the casing and cover as in a great many of the instruments now in use. Another advantage of this instrument is the fact that the back of the thermostat housing is formed of a separate metallic plate which is made of a relatively thin metal and a metal which has a higher rate of heat conductivity than the rest of the switch casing. In this manner, the thermostat may be made to respond more rapidly to the variations in temperature within the pipe to which the instrument is attached.

Another feature of advantage is the fact that the sides and front of the thermostat housing are drawn up from the back of the instrument casing which means that the instrument may be made more easily, more cheaply, and of fewer parts.

The single embodiment disclosed is intended to be illustrative only and I intend to be limited only by the scope of the appended claims and not by the particular embodiment disclosed.

I claim as my invention:

1. A device of the class described comprising in combination, a casing having a back, part of which extends inwardly of the casing to form part of a housing, a member made of material having a high heat conductivity and forming the back of said housing, a thermostat within said housing, and means operated by said thermostat.

2. A device of the class described comprising in combination, a casing having a back, part of which extends inwardly of the casing to form part of a housing, a member made of material having a high heat conductivity closing the rear of said housing and extending to the rear slightly beyond the back of said casing, a thermostat within said housing, an opening in said housing, and a switch operated by said thermostat.

3. A device of the class described comprising in combination, a casing having a back, part of which extends inwardly of the casing to form part of a housing, a plate made of material having a high heat conductivity and forming another part of said housing, an opening in said housing, an arm mounted on said plate within said housing and having a portion extending through the opening in said housing, a thermostat mounted on said arm, control means operated by said thermostat, and means for adjusting said arm for varying the temperature at which the thermostat will operate said control means.

4. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, said plate extending slightly further to the rear than the back of said casing, a thermostat within said housing and in metallic contact with said plate, and a switch located outside of said housing and operated by said thermostat.

5. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, an opening in said housing, an arm rotatably mounted on said plate, a thermostat mounted at one end to said arm within said housing, a switch, said switch being carried by the other end of said thermostat, and means to rotate said arm for varying the temperature at which the thermostat will actuate the switch.

6. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, a spindle extending through the center of said plate, an arm rotatably mounted about said spindle, a thermostat of the bimetallic coil type having one end secured to said arm, a mercury switch, means connecting the switch to the other end of said thermostat whereby the former is actuated by the latter, and means for rotating said arm for varying the temperature at which the thermostat actuates the switch.

7. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, a spindle extending through the center of said plate, an arm rotatably mounted on said spindle, a thermostat of the bimetallic coil type having one end secured to said arm, a switch carriage located outside of said housing, a shaft connecting said carriage to the other end of said thermostat, said shaft forming an axis of rotation as said thermostat expands and contracts due to temperature changes, a switch clip pivotally mounted on said carriage, a driving connection between said carriage and switch clip including a lost motion, a mercury switch carried by said switch clip, and means for rotating said arm to vary the temperature at which the thermostat actuates the switch.

8. A device of the class described comprising in combination, a switch casing having a back adapted to be mounted in a vertical position, a thermostat positioned in said casing to respond to a temperature which is responsive to the amount of heat conducted through the back of said casing, a switch operated by said thermostat, and cut away portions in the back of said casing forming arms which are adapted to receive straps for supporting said casing against a body to whose temperature the thermostat responds, the arms being so positioned that the portion of the back of the casing adjacent the thermostat is held in contact with said body.

9. A device of the class described comprising in combination, a switch casing having a back adapted to be mounted in a vertical position, a thermostat positioned in said casing to respond to a temperature which is dependent upon the amount of heat conducted through the back of said casing, a switch operated by said thermostat, and cut away portions in the back of said casing forming two vertically extending arms and two horizontally extending arms adapted to receive straps for mounting said casing vertically on a vertical or horizontal pipe respectively, the arms being so positioned that in each case the portion of the back of the casing adjacent the thermostat is held in contact with said pipe.

10. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, a thermostat within said housing and in metallic contact with said plate, and cut away portions in the back of said casing forming two pairs of arms, one pair extending vertically for mounting said casing vertically on a vertical pipe, and the other pair extending horizontally for mounting said casing vertically on a horizontal pipe.

11. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, an opening in said housing, an arm rotatably mounted on said plate, a thermostat mounted at one end to said arm within said housing, a switch, said switch being carried by the other end of said thermostat, cut away portions in the back of said casing forming two pairs of arms, one pair extending vertically for mounting said casing vertically on a vertical pipe, the other pair extending horizontally for mounting said casing vertically on a horizontal pipe, a cover for said casing, said arms terminating inside of said cover, a slot in said cover, and means extending through said slot for rotating said arm.

12. In a device of the class described comprising in combination, a metal casing having a back, part of which extends inwardly to form the sides and front of a housing, a plate formed of a metal which is more highly heat conductive than that of said casing and which is connected to the back of said casing to form the back of said housing, a spindle extending through the center of said plate, an arm rotatably mounted on said spindle, a thermostat of the bimetallic coil type having one end secured to said arm, a metallic pin, a transverse slot in one end of said pin, said pin having a hole extending longitudinally from its other end to said slot, the other end of said thermostat being inserted in said slot, a projection on one side of said thermostat which extends within said hole, at least one notch in said thermostat opposite said projection, part of the metal around said slot extending into said notch or notches to maintain said thermostat fixed with respect to said pin, and a mercury switch carried by said pin.

13. In a device of the character described comprising in combination, a bimetallic coiled thermostat supported at one end, a metallic pin, a transverse slot in one end of said pin, a hole extending longitudinally from its other end to said slot, the other end of said thermostat being inserted in said slot, a projection on said thermostat extending into said hole, means preventing withdrawal of said projection from said slot, and control means operated by said pin.

14. In a device of the character described comprising in combination, a bimetallic coiled thermostat supported at one end, a metallic pin, a transverse slot in one end of said pin, a hole extending longitudinally from its other end to said slot, the other end of said thermostat being inserted in said slot, a projection on said thermostat extending into said hole, notches in said thermostat within the slot, part of the metal from around said slot projecting into said notches whereby said projection is held in said hole, a support for a mercury switch, means for connecting said support to said pin including a screw extending within said hole from the other end of said pin, and a mercury switch carried by said support.

15. A device of the class described comprising in combination, a metal casing having a back, part of which extends inwardly to form the sides and front of a housing, a plate formed of a metal which is more highly heat conductive than that of said casing and which is connected to the back of said casing to form the back of said housing, said plate having a central depression, an annular friction member adjacent said plate surrounding said depression, an arm having an annular portion adapted to lie against said friction member, a spindle extending through the center of said depression, a second friction member slightly bowed inwardly and held against the other side of said annular portion of said arm whereby said two friction members resist rotation of said arm, a thermostat of the bimetallic coiled type having one end secured to said arm, control means actuated by said thermostat, and means for rotating said arm whereby the temperature at which the thermostat will actuate the control means may be varied.

BERTRAM P. POND.